US012705736B2

(12) United States Patent
Masuda et al.

(10) Patent No.: US 12,705,736 B2
(45) Date of Patent: Aug. 11, 2026

(54) MEDICAL IMAGE PROCESSING APPARATUS TO ESTIMATE A SHAPE OF A REGION OF INTEREST IN AN IMAGE

(71) Applicant: Canon Kabushiki Kaisha, Tokyo (JP)

(72) Inventors: Yukiteru Masuda, Kawasaki (JP); Ryo Ishikawa, Kawasaki (JP); Toru Tanaka, Funabashi (JP); Gakuto Aoyama, Nasushiobara (JP)

(73) Assignee: Canon Kabashiki Kaisha, Tokyo (JP)

( * ) Notice: Subject to any disclaimer, the term of this patent is extended or adjusted under 35 U.S.C. 154(b) by 377 days.

(21) Appl. No.: 18/191,124

(22) Filed: Mar. 28, 2023

(65) Prior Publication Data

US 2023/0316513 A1 Oct. 5, 2023

(30) Foreign Application Priority Data

Mar. 31, 2022 (JP) ................................ 2022-058611

(51) Int. Cl.
*G06T 7/60* (2017.01)
*G06T 7/00* (2017.01)
*G06T 7/11* (2017.01)

(52) U.S. Cl.
CPC .............. *G06T 7/0012* (2013.01); *G06T 7/60* (2013.01); *G06T 2207/10081* (2013.01); *G06T 2207/20081* (2013.01); *G06T 2207/20084* (2013.01); *G06T 2207/30048* (2013.01)

(58) Field of Classification Search
CPC ..................... G06T 7/0012; G06T 7/60; G06T 2207/10081; G06T 2207/20081; G06T 2207/20084; G06T 2207/30048; G06T 2207/10076; G06T 2207/20016; G06T 7/11

See application file for complete search history.

(56) References Cited

U.S. PATENT DOCUMENTS

| | | | | |
|---|---|---|---|---|
| 11,417,000 | B2 | 8/2022 | Yamazaki et al. | |
| 2010/0067760 | A1* | 3/2010 | Zhang | G06T 7/143 382/130 |
| 2015/0305706 | A1* | 10/2015 | Kanik | A61B 8/5223 600/443 |

(Continued)

FOREIGN PATENT DOCUMENTS

| | | | |
|---|---|---|---|
| JP | 2021-69793 A | | 5/2021 |
| WO | WO 2006/068271 | A1 | 6/2006 |

OTHER PUBLICATIONS

Extended European Search Report issued Jul. 7, 2023 in European Application No. 23165243.9, 10 pages.

(Continued)

*Primary Examiner* — Siamak Harandi
(74) *Attorney, Agent, or Firm* — Oblon, McClelland, Maier & Neustadt, L.L.P.

(57) ABSTRACT

A medical image processing apparatus of an embodiment includes processing circuitry. The processing circuitry acquires an input image including a region of interest of a subject. The processing circuitry acquires information on an existence probability of the region of interest on the basis of the input image. The processing circuitry calculates an estimated value of a shape of the region of interest on the basis of the input image and the information on the existence probability.

18 Claims, 10 Drawing Sheets

(56) References Cited

U.S. PATENT DOCUMENTS

| | | | |
|---|---|---|---|
| 2020/0410670 A1 | 12/2020 | Gerard et al. |
| 2021/0133977 A1 | 5/2021 | Yamazaki et al. |

OTHER PUBLICATIONS

Pu, Yan et al., "A Coarse to Fine Framework for Multi-organ Segmentation in Head and Neck Images", *2021 Digital Image Computing: Techniques and Applications* (*DICTA*), Aug. 26, 2020, XP033873798, 6 pages.

Carnahan, Patrick et al., "DeepMitral: Fully Automatic 3D Echocardiography Segmentation for Patient Specific Mitral Valve Modelling", *16th European Conference—Computer Vision—ECCV 2020*, Sep. 21, 2021, XP047611302, pp. 459-468 (10 pages).

Suman, Abdulla Al et al., "Two-stage U-Net++ for Medical Image Segmentation", *2021 Digital Image Computing: Techniques and Applications* (*DICTA*), Nov. 29, 2021, XP034058295, 6 pages.

Jamart, Kevin et al., "Two-Stage 2D CNN for Automatic Atrial Segmentation from LGE-MRIs", *16th European Conference—Computer Vision—ECCV 2020*, Jan. 23, 2020, XP047534411, pp. 81-89 (9 pages).

Panda Ananya et al: "Two-stage deep learning model for fully automated pancreas segmentation on computed tomography: Comparison with intra-reader and inter-reader reliability at full and reduced radiation dose on an external dataset", *Medical Physics*., Mar. 16, 2021, vol. 48, No. 5, XP093057511, pp. 2468-2481 (14 pages).

Moon et al., "I2L-MeshNet: Image-to-Lixel Prediction Network for Accurate 3D Human Pose and Mesh Estimation from a Single RGB Image", ECCV, 2020, 16 pages.

European Communication pursuant to Article 94(3) EPC issued Oct. 6, 2025, in corresponding European Patent Application No. 23 165 243.9, 6 pages.

Office Action issued Nov. 5, 2025, in corresponding Japanese Patent Application No. 2022-058611, 4 pages.

Office Action issued Mar. 25, 2026, in corresponding Japanese Patent Application No. 2022-058611 with English translation, herein, 10 pages.

* cited by examiner

FIG.8

| Layers | Output Size | Kernel, stride |
|---|---|---|
| Convolution | 32 ∗ 32 ∗ 32 | 7 ∗ 7 ∗ 7 conv, stride2 |
| Pooling | 16 ∗ 16 ∗ 16 | 3 ∗ 3 ∗ 3 Maxpooling, stride2 |
| Dense Block (1) | 16 ∗ 16 ∗ 16 | [1 ∗ 1 conv, 3 ∗ 3 conv] *6 |
| Transition Layer (1) | 16 * 16 * 16 | 1 ∗ 1 conv |
| | 8 ∗ 8 ∗ 8 | 2 ∗ 2 average pool, stride 2 |
| Dense Block (2) | 8 ∗ 8 ∗ 8 | [1 ∗ 1 conv, 3 ∗ 3 conv] *12 |
| Transition Layer (2) | 8 ∗ 8 ∗ 8 | 1 ∗ 1 conv |
| | 4 ∗ 4 ∗ 4 | 2 ∗ 2 average pool, stride 2 |
| Dense Block (3) | 4 ∗ 4 ∗ 4 | [1 ∗ 1 conv, 3 ∗ 3 conv] *24 |
| Transition Layer (3) | 4 ∗ 4 ∗ 4 | 1 ∗ 1 conv |
| | 2 ∗ 2 ∗ 2 | 2 ∗ 2 average pool, stride 2 |
| Dense Block (4) | 2 ∗ 2 ∗ 2 | [1 ∗ 1 conv, 3 ∗ 3 conv] *16 |
| Output Layer | 1024 | 2 ∗ 2 ∗2 Global Average Pool |
| | 1188 | 1188D fully-connected |

MEDICAL IMAGE PROCESSING APPARATUS TO ESTIMATE A SHAPE OF A REGION OF INTEREST IN AN IMAGE

CROSS-REFERENCE TO RELATED APPLICATIONS

This application is based upon and claims the benefit of priority from Japanese Patent Application No. 2022-058611, filed on Mar. 31, 2022; the entire contents of which are incorporated herein by reference.

FIELD

Embodiments disclosed herein generally relate to a medical image processing apparatus, a medical image processing method, and a non-transitory computer readable medium.

BACKGROUND

In the related art, estimation for a region of interest in an image has been used for various analyses. For example, methods have been known to calculate the probability of the location of each joint of the human body in a two-dimensional image, and to calculate the three-dimensional orientation of the human body in the two-dimensional image on the basis of the two-dimensional image and the probability of the location of each joint. For example, methods have been known to extract the liver with high accuracy by using a classifier that calculates the probability of each of the liver, the heart, and others in an image, and a classifier that classifies the liver and the heart in a slice including both the heart and the liver.

BRIEF DESCRIPTION OF THE DRAWINGS

FIG. 8 is a diagram illustrating an example of a layer structure of a DenseNet according to the first embodiment;

DETAILED DESCRIPTION

Hereinafter, embodiments of a medical image processing apparatus, a medical image processing method, and a non-transitory computer readable medium are described in detail with reference to the drawings. The medical image processing apparatus, the medical image processing method, and the non-transitory computer readable medium according to the present application are not limited by the following embodiments.

First Embodiment

A medical image processing apparatus according to the present embodiment is an apparatus that acquires a three-dimensional medical image and calculates the shape of a region of interest (for example, mitral valve) included in the medical image. By displaying the shape of the region of interest calculated in the present embodiment, a user can clearly ascertain the shape of the region of interest in the medical image.

Figure 1:
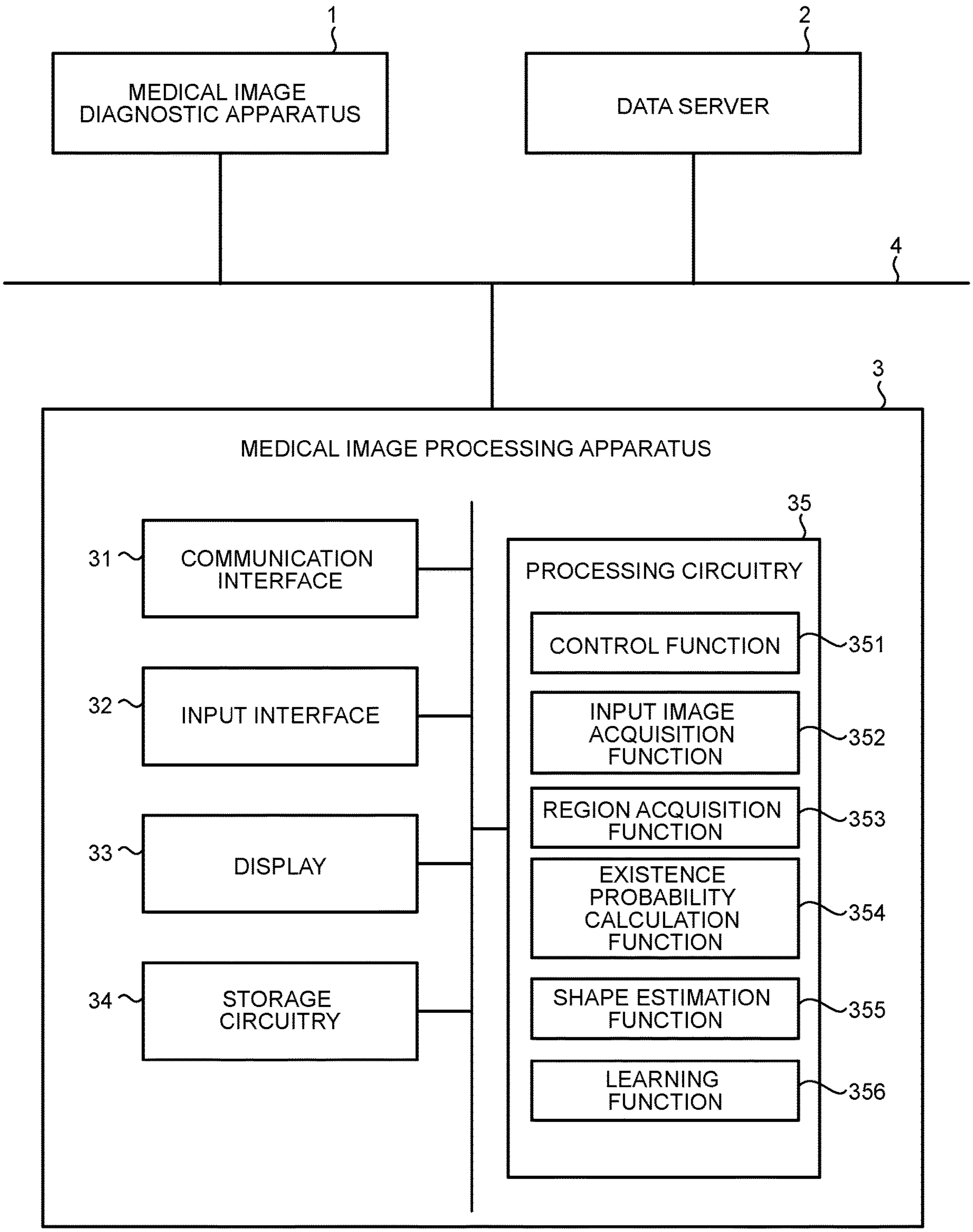
FIG. 1 is a diagram illustrating a configuration example of a medical image processing apparatus according to a first embodiment.

FIG. 1 is a diagram illustrating a configuration example of a medical image processing apparatus according to the first embodiment. For example, as illustrated in FIG. 1, a medical image processing apparatus 3 according to the present embodiment is communicably connected to a medical image diagnostic apparatus 1 and a data server 2 via a network 4. The network 4 includes, for example, a local area network (LAN) and a wide area network (WAN). Various other apparatuses and systems may be connected to the network 4 illustrated in FIG. 1.

The medical image diagnostic apparatus 1 captures an image of a subject and generates a three-dimensional medical image. The medical image diagnostic apparatus 1 transmits the generated medical image to various apparatuses on the network. Examples of the medical image diagnostic apparatus 1 include an X-ray computed tomography (CT) apparatus, a magnetic resonance imaging (MRI) apparatus, an X-ray diagnostic apparatus, an ultrasonic diagnostic apparatus, a single photon emission computed tomography (SPECT) apparatus, and a positron emission computed tomography (PET) apparatus.

The data server 2 stores various medical images on a subject. Specifically, the data server 2 receives the medical image from the medical image diagnostic apparatus 1 via the network 4, and stores the medical image in storage circuitry in the data server 2. For example, the data server 2 is implemented by a picture archiving and communication system (PACS) or the like, and stores the medical image in a format conforming to a digital imaging and communications in medicine (DICOM).

The medical image processing apparatus 3 performs various types of image processing on the three-dimensional medical image. Specifically, the medical image processing apparatus 3 receives the medical images from the medical image diagnostic apparatus 1 or the data server 2 via the network 4, and performs various types of image processing by using the medical images. For example, the medical image processing apparatus 3 is implemented by computer equipment such as a server and a workstation.

For example, the medical image processing apparatus 3 is an apparatus that causes a display 33 to display the three-dimensional medical image and a processing result generated by processing circuitry 35 to be described below, and serves as a terminal apparatus for interpretation operated by a user such as a doctor. The medical image processing apparatus 3 includes a communication interface 31, an input interface 32, the display 33, storage circuitry 34, and the processing circuitry 35.

The communication interface 31 controls transmission and communication of various data transmitted/received between the medical image processing apparatus 3 and an external apparatus (the medical image diagnostic apparatus 1, the data server 2, or the like) connected via the network. Specifically, the communication interface 31 is connected to the processing circuitry 35, and transmits data received from the external apparatus to the processing circuitry 35 or transmits data received from the processing circuitry 35 to the external apparatus. For example, the communication interface 31 is implemented by a network card, a network adapter, a network interface controller (NIC), or the like.

The input interface 32 receives various instructions and input operations of various information from a user. Specifically, the input interface 32 is connected to the processing circuitry 35, converts an input operation received from the user into an electrical signal, and transmits the electrical signal to the processing circuitry 35. For example, the input interface 32 is implemented by a trackball, a switch button, a mouse, a keyboard, a touch pad for performing an input operation by touching an operation surface, a touch screen with integrated display screen and touch pad, a non-contact input interface using an optical sensor, a voice input interface, or the like. In this specification, the input interface 32 is not limited to only those with physical operation parts such as a mouse and a keyboard. An example of the input interface 32 also includes electrical signal processing circuitry that receives an electrical signal corresponding to an input operation from an external input device provided separately from the apparatus and outputs the electrical signal to control circuitry.

The display 33 displays various information and various data. Specifically, the display 33 is connected to the processing circuitry 35 and displays various information and various data received from the processing circuitry 35. For example, the display 33 displays the three-dimensional medical image and information on the shape of the region of interest. For example, the display 33 is implemented by a liquid crystal display, a cathode ray tube (CRT) display, a touch panel, or the like.

The storage circuitry 34 stores various data and various computer programs. Specifically, the storage circuitry 34 is connected to the processing circuitry 35, stores data received from the processing circuitry 35, or reads stored data and transmits the read data to the processing circuitry 35. For example, the storage circuitry 34 is implemented by a semiconductor memory element such as a read only memory (ROM), a random access memory (RAM), and a flash memory, a hard disk, an optical disk, or the like. The storage circuitry 34 may be implemented by a cloud computer connected to the medical image processing apparatus 3 via the network 4.

The processing circuitry 35 controls the entire medical image processing apparatus 3. For example, the processing circuitry 35 performs various processes in response to input operations received from a user via the input interface 32. For example, the processing circuitry 35 receives data transmitted from the external apparatus via the communication interface 31, and stores the received data in the storage circuitry 34. For example, the processing circuitry 35 transmits data received from the storage circuitry 34 to the communication interface 31, thereby transmitting the data to the external apparatus. For example, the processing circuitry 35 displays data received from the storage circuitry 34 on the display 33.

So far, the configuration example of the medical image processing apparatus 3 according to the present embodiment has been described. For example, the medical image processing apparatus 3 according to the present embodiment is installed in medical facilities such as hospitals and clinics and assists a user such as a doctor in making various diagnoses and treatment plans. For example, the medical image processing apparatus 3 performs various processes for estimating the shape of a region of interest with high accuracy. In the following, a case where a CT image taken by an X-ray CT apparatus is acquired as a three-dimensional medical image and the shape of a mitral valve included in the CT image is estimated is described as an example.

For example, as illustrated in FIG. 1, in the present embodiment, the processing circuitry 35 of the medical image processing apparatus 3 performs a control function 351, an input image acquisition function 352, a region acquisition function 353, an existence probability calculation function 354, a shape estimation function 355, and a learning function 356. The input image acquisition function 352 is an example of an acquisition unit. The region acquisition function 353 is an example of a region acquisition unit. The existence probability calculation function 354 is an example of a first calculation unit. The shape estimation function 355 is an example of a second calculation unit. The learning function 356 is an example of a learning unit.

The control function 351 generates various graphical user interfaces (GUIs) and various display information in response to operations via the input interface 32, and controls the generated GUIs and the display information to be displayed on the display 33. For example, the control function 351 causes the display 33 to display information indicating the shape of a mitral valve estimated by the shape estimation function 355.

The input image acquisition function 352 acquires an input image including the region of interest of a subject. In the present embodiment, the input image is a three-dimensional CT image and the region of interest is the mitral valve. That is, the input image acquisition function 352 acquires the three-dimensional CT image (volume data) including the mitral valve from the medical image diagnostic apparatus 1 or the data server 2 via the communication interface 31. The input image acquisition function 352 can also acquire a plurality of volume data obtained by taking a plurality of three-dimensional images in the time direction. The processing circuitry 35 receives the CT image of the subject from the medical image diagnostic apparatus 1 or the data server 2 by performing the input image acquisition function 352 described above, and stores the received CT image in the storage circuitry 34. The process by the input image acquisition function 352 is described in detail below.

The region acquisition function 353 acquires a partial region including the region of interest from the input image. Specifically, the region acquisition function 353 acquires a three-dimensional partial region including the mitral valve from the volume data. The process by the region acquisition function 353 is described in detail below.

The existence probability calculation function 354 acquires information on the existence probability of the region of interest on the basis of the input image. Specifically, the existence probability calculation function 354 acquires the information on the existence probability of the region of interest on the basis of the partial region acquired by the region acquisition function 353. For example, the existence probability calculation function 354 calculates a probability map of the mitral valve in the volume data. The process by the existence probability calculation function 354 is described in detail below.

The shape estimation function 355 calculates an estimated value of the shape of the region of interest on the basis of the input image and the existence probability. Specifically, the shape estimation function 355 calculates the estimated value of the shape of the region of interest on the basis of the partial region acquired by the region acquisition function 353 and the existence probability. For example, the shape estimation function 355 calculates information indicating the shape of the mitral valve on the basis of the volume data and the probability map of the mitral valve. The process by the shape estimation function 355 is described in detail below.

The learning function 356 generates a learned model used for the existence probability calculation function 354 and the shape estimation function 355. Specifically, the learning function 356 constructs the learned model that uses, as input, the input image including the region of interest of the subject and outputs the information on the existence probability of the region of interest. The learning function 356 also constructs the learned model that uses, as input, the input image and the information on the existence probability and outputs the estimated value of the shape of the region of interest. The process by the learning function 356 is described in detail below.

The processing circuitry 35 described above is implemented by, for example, a processor. In such a case, the processing functions described above are stored in the storage circuitry 34 in the form of computer programs executable by a computer. The processing circuitry 35 reads the computer programs stored in the storage circuitry 34 and executes the read computer programs, thereby implementing functions corresponding to the executed computer programs. In other words, the processing circuitry 35 in the state of reading the computer programs has the processing functions illustrated in FIG. 1.

The processing circuitry 35 may be configured by combining a plurality of independent processors, and respective processors may implement respective processing functions by executing respective computer programs. Furthermore, the respective processing functions of the processing circuitry 35 may be implemented by being appropriately distributed or integrated into single processing circuitry or a plurality of pieces of processing circuitry. Furthermore, the respective processing functions of the processing circuitry 35 may be implemented by a combination of hardware such as circuitries and software. In the above, an example in which the computer programs corresponding to the respective processing functions are stored in the single storage circuitry 34 has been described; however, the embodiment is not limited thereto. For example, the computer programs corresponding to the respective processing functions may be distributed and stored in a plurality of pieces of storage circuitry, and the processing circuitry 35 may be configured to read each computer program from each storage circuitry and execute the read computer program. A part of each processing function of the processing circuitry 35 may also be implemented by a cloud computer connected to the medical image processing apparatus 3 via the network 4.

Figure 2:
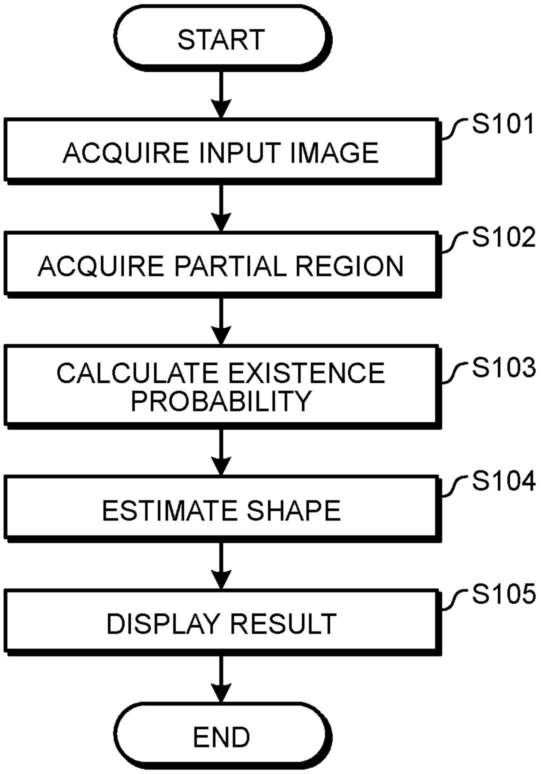
FIG. 2 is a flowchart illustrating an example of a processing procedure of the medical image processing apparatus according to the first embodiment.

A processing procedure of the medical image processing apparatus 3 is now described with reference to FIG. 2, and then details of each process are described. FIG. 2 is a flowchart illustrating an example of a processing procedure of the medical image processing apparatus 3 according to the first embodiment.

For example, as illustrated in FIG. 2, in the present embodiment, the input image acquisition function 352 acquires the input image (three-dimensional CT image) of the subject from the medical image diagnostic apparatus 1 or the data server 2 (step S101). For example, the input image acquisition function 352 acquires a three-dimensional CT image including morphological information of an anatomical structure of the mitral valve in response to a three-dimensional CT image acquisition operation via the input interface 32. This process is implemented by, for example, the processing circuitry 35 that calls a computer program corresponding to the input image acquisition function 352 from the storage circuitry 34 and executes the called computer program.

Subsequently, the region acquisition function 353 extracts a three-dimensional partial region including the region of interest (mitral valve) from the acquired three-dimensional CT image (step S102). This process is implemented by, for example, the processing circuitry 35 that calls a computer program corresponding to the region acquisition function 353 from the storage circuitry 34 and executes the called computer program.

Subsequently, the existence probability calculation function 354 calculates the existence probability of the mitral valve for each voxel included in the partial region (step S103). This process is implemented by, for example, the processing circuitry 35 that calls a computer program corresponding to the existence probability calculation function 354 from the storage circuitry 34 and executes the called computer program.

Subsequently, the shape estimation function 355 estimates the shape of the mitral valve included in the partial region on the basis of the partial region and the existence probability of the mitral valve (step S104). This process is implemented by, for example, the processing circuitry 35 that calls a computer program corresponding to the shape estimation function 355 from the storage circuitry 34 and executes the called computer program.

Subsequently, the control function 351 causes the display 33 to display a result indicating the estimated shape of the mitral valve (step S105). This process is implemented by, for example, the processing circuitry 35 that calls a computer program corresponding to the control function 351 from the storage circuitry 34 and executes the called computer program.

Hereinafter, details of each process performed by the medical image processing apparatus 3 are described below.

Input Image Acquisition Process

As described at step S101 in FIG. 2, the input image acquisition function 352 acquires volume data including three-dimensional morphological information of the mitral valve to be observed in response to a volume data acquisition operation via the input interface 32. For example, the input image acquisition function 352 acquires a three-dimensional CT image of the mitral valve.

The input image acquisition process at step S101 may be started by an instruction from a user via the input interface 32 as described above, but may also be started automatically. In such a case, for example, the input image acquisition function 352 monitors the data server 2 and automatically acquires volume data each time new volume data is stored.

The input image acquisition function 352 may determine newly stored volume data on the basis of preset acquisition conditions, and perform the acquisition process when the volume data satisfies the acquisition conditions. For example, the acquisition conditions that can determine the status of volume data are stored in the storage circuitry 34, and the input image acquisition function 352 determines the newly stored volume data on the basis of the acquisition conditions stored in the storage circuitry 34.

To give an example, the storage circuitry 34 stores, as the acquisition conditions, "acquisition of volume data taken with imaging protocol targeting heart valve", "acquisition of magnification reconstruction medical image", or a combination thereof. The input image acquisition function 352 acquires volume data satisfying the acquisition conditions described above.

Partial Region Acquisition Process

As described at step S102 in FIG. 2, the region acquisition function 353 acquires the partial region including the region of interest from the input image (volume data). Specifically, the region acquisition function 353 first coarsely specifies the partial region in the input image where the mitral valve to be observed exists. Subsequently, the region acquisition function 353 crops the specified partial region from the input image to acquire a volume of interest (VOI) image (cutting out process). The region acquisition function 353 transmits the acquired VOI image to the existence probability calculation function 354. In the following, the VOI image is described as a three-dimensional image obtained by cropping a rectangular parallelepiped region including the entire mitral valve from the input image; however, the shape and size of the VOI image may be any shape and size as long as the VOI image includes the mitral valve.

Various methods can be used to coarsely specify the partial region where the mitral valve exists. For example, a method can be used to detect an anatomical feature points or anatomical regions around the mitral valve by image processing on the input image and specify the partial region on the basis of the location. More specifically, since the mitral valve is a structure located between a left atrium and a left ventricle, regions of the left atrium and the left ventricle of the heart of the subject can be acquired from the input image by a segmentation process using known techniques, and the region where the mitral valve exists can be coarsely specified on the basis of the region where these regions are adjacent to each other.

Examples of the above segmentation process include Otsu's binarization method based on CT values, a region expansion method, a snake method, a graph cut method, and a mean shift method. The present process can be performed using any method that can specify the regions of the left atrium or the left ventricle from the input image, and the present embodiment is not limited to the method of specifying the region. For example, the region may be specified using a learned model of the regions of the left atrium or the left ventricle constructed on the basis of training data prepared in advance using a machine learning technique (including deep learning). The region may also be set manually.

In another example, a process can be performed on the input image to detect the location of a *Trigona fibrosa* (Trigone), which is a type of anatomical region between the left atrium and the aorta, and to specify the partial region where the mitral valve exists, on the basis of the detected location. The location of the *Trigona fibrosa* may be detected using a known feature point detection process, or feature points may be set manually. Any feature point may be used as long as the feature point is related to the location of the mitral valve rather than the *Trigona fibrosa*.

In further another example, the locations of other organs (such as lungs and liver) adjacent to the heart of the subject can be detected and the partial region where the mitral valve exists can be specified on the basis of the detected locations of the organs. The region where the mitral valve exists may be a rectangular parallelepiped region circumscribed by the mitral valve or a wider region including the mitral valve. The region detection process can be implemented by a known segmentation process or machine learning process in the same way as the extraction process of the left atrium and the left ventricle described above. Of course, the region may also be set manually.

Figure 3:
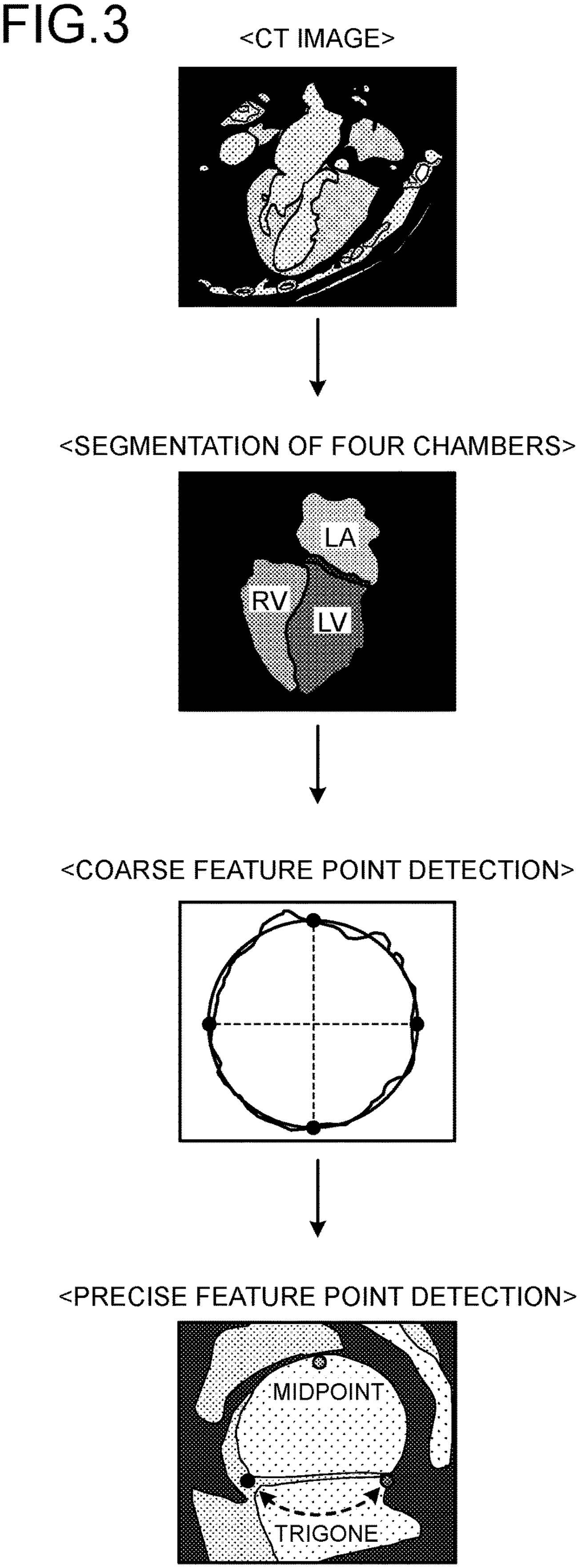
FIG. 3 is a diagram for explaining an example of a process by a region acquisition function according to the first embodiment.

As described above, the region acquisition function 353 can acquire the partial region by using various methods. The region acquisition function 353 can also specify the partial region where the mitral valve exists in a stepwise manner by combining a plurality of methods. FIG. 3 is a diagram for explaining an example of a process by the region acquisition function 353 according to the first embodiment. FIG. 3 illustrates the image in two dimensions, but the region acquisition function 353 actually performs the following process on the three-dimensional image.

For example, as illustrated in FIG. 3, the region acquisition function 353 first performs a segmentation process of four chambers of the heart (left ventricle: LV, right ventricle: RV, left atrium: LA, and right atrium: RA) in the CT image. Then, the region acquisition function 353 performs a precise feature point detection process of detecting coarse feature points around the mitral valve and then detecting the location of Trigone. Thereafter, the region acquisition function 353 specifies the partial region including the mitral valve on the basis of the detected location of the Trigone, and acquires a VOI image by cropping the specified partial region from the input image. This allows the region acquisition function 353 to accurately acquire the partial region including the mitral valve.

The specifying of the partial region is not limited to automatic processing such as image processing, and for example, a user may be allowed to designate a location (designate the location of an edge of the VOI image) via the input interface 32 and to acquire the partial region on the basis of the designated location. Alternatively, information on the region in the input image where the mitral valve exists may be configured to be acquired from the data server 2.

The region acquisition function 353 can perform the above-described VOI image cropping process on the basis of the location and orientation of the mitral valve, and control the mitral valve to be depicted at the approximate center of the VOI image in a predetermined orientation and size even though the mitral valve is depicted in any location, orientation, and size in the input image. For example, the region acquisition function 353 specifies the location, orientation, and size of the mitral valve in the input image on the basis of the location of anatomical features around the mitral valve in the input image and instruction information from a user. Then, the region acquisition function 353 crops the VOI image from the input image so that the mitral valve is depicted at the approximate center of the VOI image in a predetermined orientation and size. That is, the region acquisition function 353 can perform the cropping process on the input image in any direction and acquire a VOI image.

To give an example, the region acquisition function 353 estimates the annulus of the mitral valve on the basis of the location of the anatomical features around the mitral valve in the input image, and crops the VOI image from the input image so that the centroid of the annulus is located at the center in the VOI image of 64×64×64 pixels and includes the entire annulus. In the present processing step, the region acquisition function 353 may perform a normalization process on the VOI image acquired by the cropping process so that the mean or variance value of pixel values is a predetermined value. The region acquisition function 353 may also perform an arbitrary filtering process on the VOI image for the purpose of noise reduction.

FIG. 2 illustrates an example of acquiring the VOI image (partial region) after the input image is acquired; however, the embodiment is not limited thereto and may include a case where an image obtained by cropping the region where the mitral valve exists is acquired as the input image. In such a case, the cropping process after the input image acquisition is not performed, and the subsequent processes are performed with the input image itself as the VOI image.

The VOI image cropping process is a process for performing the subsequent processes more accurately or efficiently, and this process may be omitted and the processes after S103 may be performed on the entire input image. That is, the present embodiment is not limited to the presence or absence of the process of this step.

Existence Probability Calculation Process

As described at step S103 in FIG. 2, the existence probability calculation function 354 calculates the existence probability of the mitral valve for each voxel included in the VOI image. The existence probability calculation function 354 can use various methods as a process of calculating the existence probability of the mitral valve from the VOI image. For example, the existence probability calculation function 354 calculates information on the existence probability of the region of interest by a process based on machine learning. That is, the existence probability calculation function 354 calculates the existence probability of the mitral valve from the VOI image by a method based on the machine learning.

When the method based on the machine learning is used as the process of calculating the existence probability, the learning function 356 performs a learning process for acquiring a learned model prior to the existence probability calculation process. Hereinafter, a learned model related to the existence probability calculation process is described with reference to FIGS. 4A and 4B.

Figure 4A:
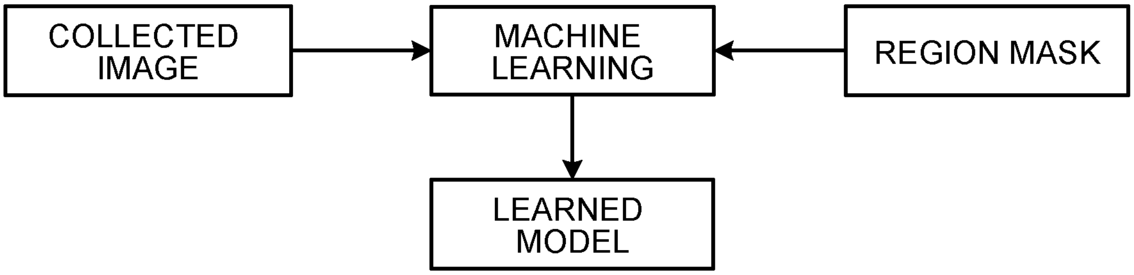
FIG. 4A is a diagram for explaining an example of constructing a learned model related to an existence probability calculation process according to the first embodiment.

FIG. 4A is a diagram for explaining an example of constructing a learned model related to the existence probability calculation process according to the first embodiment. For example, as illustrated in FIG. 4A, the learning function 356 generates a learned model by machine-learning a plurality of sets of data (training data) of a collected image depicting the mitral valve and a region mask indicating whether each pixel of the image is the mitral valve. For example, the learning function 356 generates the learned model by machine-learning training data with a 64×64×64 pixel image including the mitral valve and a region mask indicating whether each pixel in the image is the mitral valve. Then, the learning function 356 stores the generated learned model in the data server 2 or the storage circuitry 34.

Figure 4B:
FIG. 4B is a diagram illustrating an example of a learned model related to the existence probability calculation process according to the first embodiment.

The existence probability calculation function 354 calculates the existence probability of the mitral valve by reading the above learned model stored in the data server 2 or the storage circuitry 34 and inputting the input image into the read learned model. For example, as illustrated in FIG. 4B, the existence probability calculation function 354 acquires a probability map indicating whether each voxel in the VOI image is the mitral valve by inputting the VOI image acquired by the region acquisition function 353 into the learned model. FIG. 4B is a diagram illustrating an example of a learned model related to the existence probability calculation process according to the first embodiment.

The existence probability calculation process may be performed for a plurality of target structures. That is, the region of interest includes a plurality of sites, and the existence probability calculation function 354 can calculate the existence probability for each of the plurality of sites. For example, the mitral valve has two structures: an anterior leaflet and a posterior leaflet. Accordingly, the existence probability calculation function 354 may calculate, as the existence probability of the mitral valve, one existence probability representing the entire mitral valve, or calculate the existence probability of each of the anterior leaflet and the posterior leaflet of the mitral valve. When calculating the existence probability of each of the anterior leaflet and the posterior leaflet of the mitral valve, the existence probability calculation function 354 may calculate the existence probability (two-channel existence probability) including both the probability of the anterior leaflet and the probability of the posterior leaflet, or may individually generate a learned model for calculating the existence probability of each of the anterior leaflet and the posterior leaflet and calculate the existence probability of each of the anterior leaflet and the posterior leaflet by using the learned model.

In the present embodiment, a case where the existence probability calculation process is performed using a U-net, which is a type of convolutional neural network (CNN), is described as a specific example of the above method based on the machine learning. The U-Net is a learning model including an encoder and a decoder, wherein the encoder can convolute the input image several times to extract features of the image, and the decoder can receive the features extracted by the encoder and deconvolute the received features to calculate a feature map of the same size as the input image.

In the case of the present embodiment, by preparing a plurality of sets of the above-described training data and causing the 3D U-Net to learn the training data, features for the mitral valve region can be extracted by the encoder and a feature map of the features can be calculated by the decoder. This feature map is utilized as the existence probability of the mitral valve.

Figure 5:
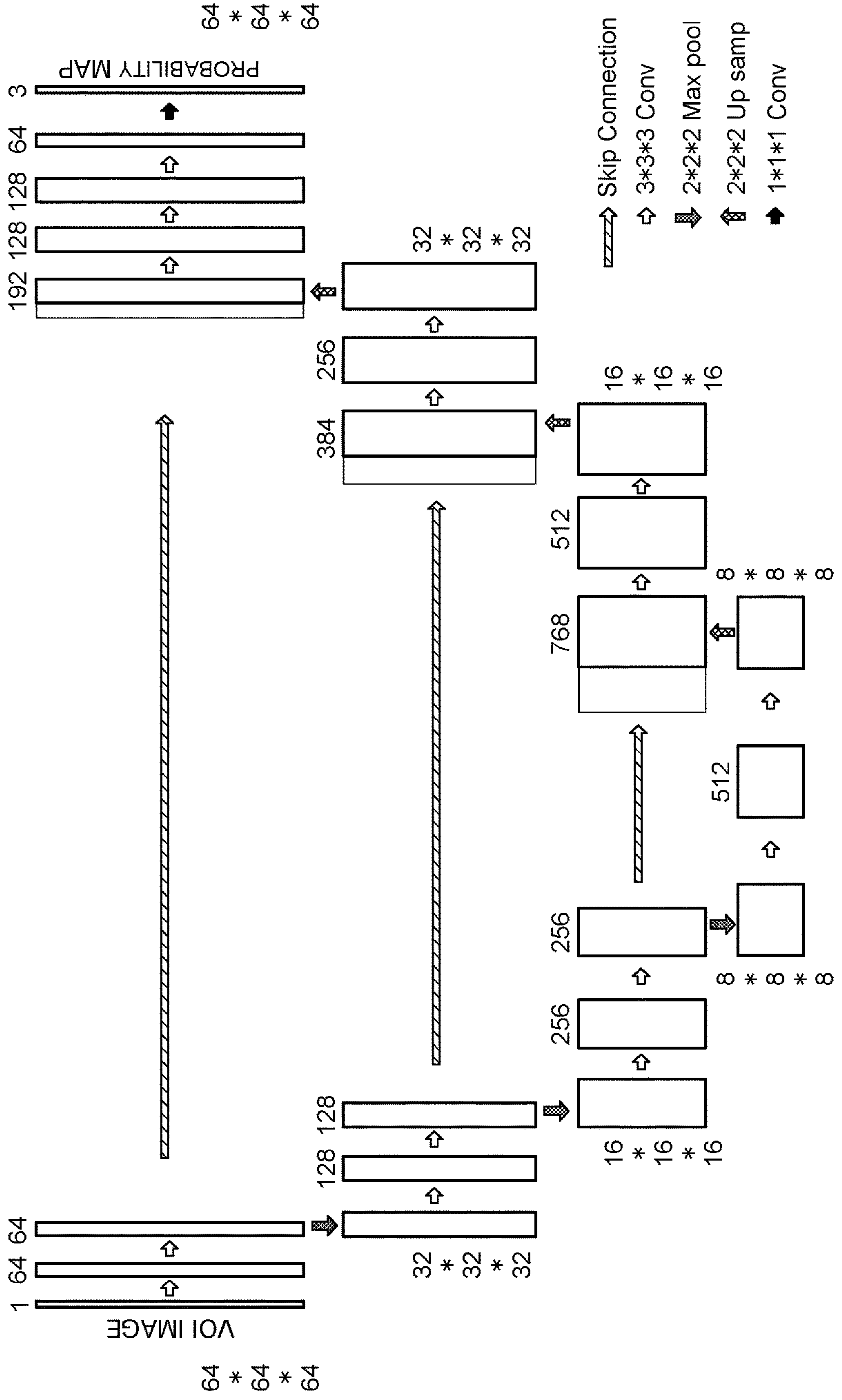
FIG. 5 is a diagram illustrating an example of a layer structure of a 3D U-Net according to the first embodiment.

FIG. 5 is a diagram illustrating an example of a layer structure of the 3D U-Net according to the first embodiment. For example, the 3D U-Net includes a convolution layer, a pooling layer, and an up-sampling layer, and outputs the probability map of the mitral valve in response to the input of the VOI image of 64×64×64 pixels. The 3D U-Net in FIG. 5 outputs a probability map of three-channels of the anterior leaflet, the posterior leaflet, and the background.

By using Cross Entropy, Dice loss function, Tversky loss function, or the like as a loss function used for CNN learning, the existence probability accurately representing information on the presence or absence of the mitral valve can be calculated.

For example, in the learning of the above 3D U-Net, which outputs the existence probability of each class of the anterior leaflet, the posterior leaflet, and the background, losses in each class of the anterior leaflet, the posterior leaflet, and the background are calculated by substituting a ground truth value and a predicted value, for each class, into the Tversky loss function expressed by Equation (1) below. Then, the sum of the losses in each class multiplied by a coefficient can be calculated by equation (2) below, and parameters of the 3D U-Net can be adjusted using the calculated losses to accurately calculate the existence probability of the mitral valve.

$$\mathrm{Loss}_T(y_k, \hat{y}_k) = 1 - \frac{\sum_{i=0}^{N} y_{0ik}\hat{y}_{0ik}}{\sum_{i=0}^{N} y_{0ik}\hat{y}_{0ik} + \alpha_k \sum_{i=0}^{N} y_{1ik}\hat{y}_{0ik} + \beta_k \sum_{i=0}^{N} y_{0ik}\hat{y}_{1ik}} \quad (1)$$

$$\mathrm{Loss}_{MCT}(y, \hat{y}) = a * \mathrm{Loss}_T(y_{ant}, \hat{y}_{ant}) + b * \mathrm{Loss}_T(y_{pos}, \hat{y}_{pos}) + c * \mathrm{Loss}_T(y_{BG}, \hat{y}_{BG}) \quad (2)$$

In equation (1) above, "$y_k$" indicates a symbol for class k of the ground truth value, and "$\hat{y}_k$" indicates a symbol for the class k of the predicted value. In equation (1) above, "N" indicates the total number of pixels in the probability map, and "i" indicates an index of a pixel in the probability map. In equation (1) above, "$y_{0ik}$" indicates a probability value (ground truth value) that a pixel with index i is in the class k, and "$y_{1ik}$" indicates a probability value (ground truth value) that a pixel with index i is not in the class k. In equation (1) above, "$\hat{y}_{0ik}$" indicates a probability value (predicted value) that a pixel with index i is in the class k, and "$\hat{y}_{1ik}$" indicates a probability value (predicted value) that a pixel with index i is not in the class k.

In equation (1) above, "$\alpha_k$" and "$\beta_k$" are weighting coefficients for false positives and false negatives, respectively, and are set to different values for each class. In the present embodiment, according to the original Tversky loss, $\alpha_k$ in the foreground (anterior leaflet and posterior leaflet) is set to 0.3, $\alpha_k$ in the background is set to 0.7, $\beta_k$ in the foreground (anterior leaflet and posterior leaflet) is set to 0.7, and $\beta_k$ in the background is set to 0.3. $\alpha_k$ of the foreground and $\beta_k$ of the background are set to equal values. Similarly, $\beta_k$ of the foreground and $\alpha_k$ of the background are also set to equal values.

In equation (2) above, "$\mathrm{Loss}_{MCT}$ (y, ŷ))" is the sum of "$\mathrm{Loss}_T(y_k, \bar{y}_k)$" for each class. In equation (2) above, "ant" indicates the anterior leaflet, "Pos" indicates the posterior leaflet, and "BG" indicates the background (neither anterior leaflet nor posterior leaflet). "a", "b", and "c" are coefficients of each $\mathrm{Loss}_T$, and for example, a is set to 0.49, b is set to 0.49, and c is set to 0.02.

Figure 6:
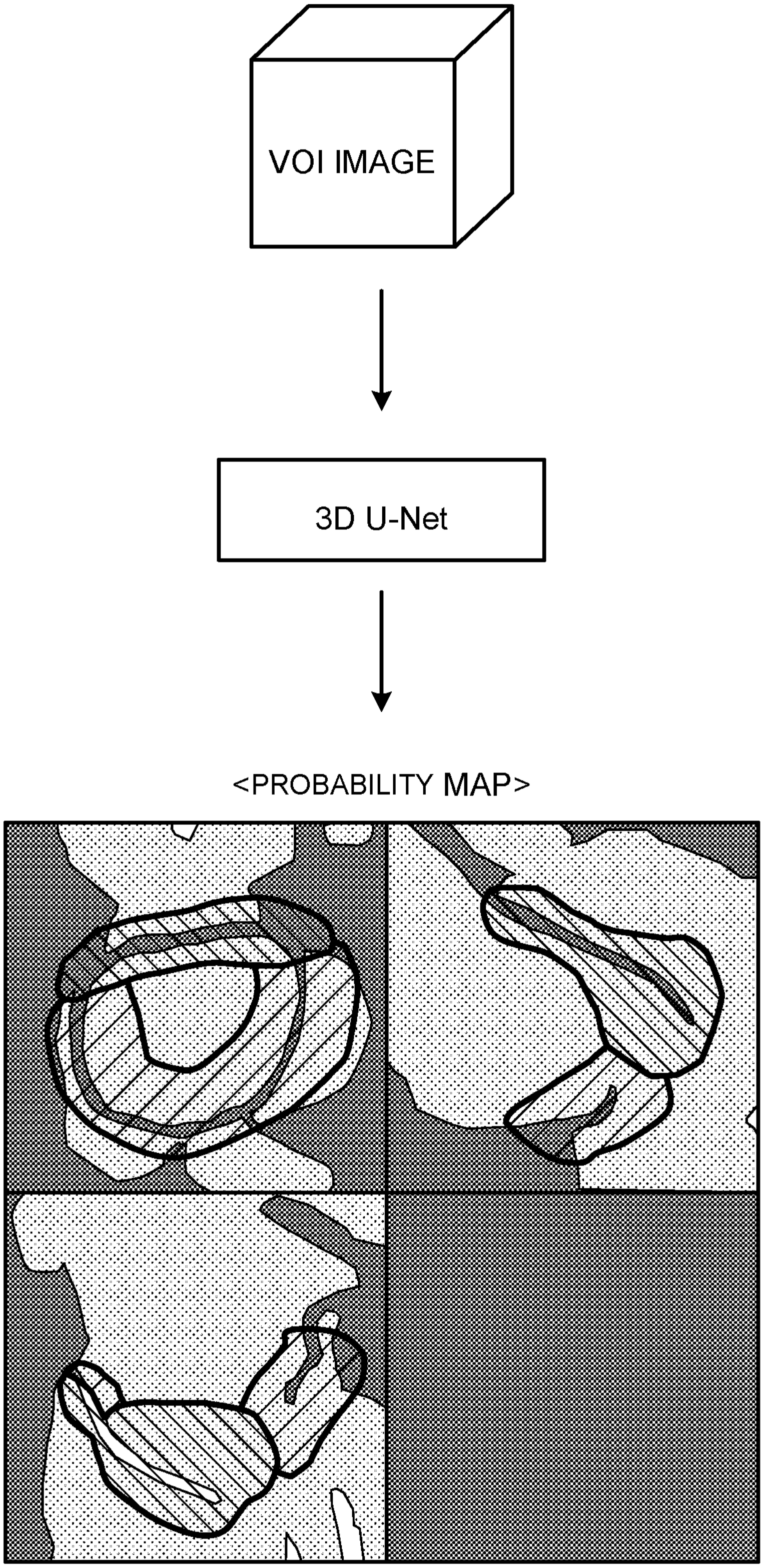
FIG. 6 is a diagram illustrating an example of a probability map according to the first embodiment.

The existence probability calculation function 354 calculates the probability map indicating the existence probability of the mitral valve in the VOI image by inputting the VOI image into the 3D U-Net generated as described above. FIG. 6 is a diagram illustrating an example of a probability map according to the first embodiment. For example, as illustrated in FIG. 6, in the calculated existence probability (probability of the anterior leaflet, probability of the posterior leaflet, and probability of the background), the existence probability calculation function 354 calculates a probability map showing pixels with a high existence probability of the anterior leaflet and pixels with a high existence probability of the posterior leaflet in the VOI image.

FIG. 6 illustrates only the probability map for three orthogonal cross sections, but the existence probability calculation function 354 actually calculates an existence probability for all voxels in the VOI image. That is, each of the existence probability of the anterior leaflet and the existence probability of posterior leaflet calculated in the present embodiment is stored as data in an image format with the same number of pixels as the VOI image, and the pixel value of each pixel is stored as a continuous value in the range in which the existence probability of the anterior leaflet or the posterior leaflet at a corresponding location has a value of [0, 1]. A pixel value of 0 indicates the lowest existence probability, meaning that a corresponding pixel is unlikely to be the anterior leaflet or the posterior leaflet, and a pixel value of 1 indicates the highest existence probability, meaning that a corresponding pixel is likely to be the anterior leaflet or the posterior leaflet.

In the above description, a case where the existence probability is calculated as a continuous value of [0, 1] has been described as an example; however, the embodiment is not limited thereto. For example, a value calculated as a continuous value of [0, 1] may be subjected to a predetermined threshold process, and a value binarized to 0 or 1 may be calculated as the existence probability of a valve. In this case, a threshold value may be adjusted so that the number of pixels with a value of 1 after binarization is a predetermined number of pixels. For example, when the volume of the mitral valve depicted in the VOI image is known in advance or when the volume can be roughly estimated, the number of pixels with a value of 1 after binarization can be adjusted according to the volume. In addition to the above, for example, what is called a noise reduction process may be performed, such as setting, to 0, the pixel value of a region where a pixel having a value of 1 when the existence probability is binarized with a predetermined threshold is spatially isolated, that is, a region with a small number of continuous regions where the pixel value is 1. These methods have the effect of suppressing the existence probability of regions other than the original mitral valve, and more accurately calculating the existence probability of the mitral valve.

In the above description, a case of using the 3D U-Net as a method of calculating the existence probability of the mitral valve from the VOI images has been described as an example; however, the embodiment is not limited thereto and known CNNs other than the 3D U-Net may also be used. For example, a fully convolutional network (FCN), a pyramid scene parsing network (PSPNet), or the like may be used. A method based on the machine learning other than CNN may be used, or any image processing method, such as a filtering process of detecting image features, may also be used to calculate the existence probability of the mitral valve in addition to the method based on the machine learning. For example, a line enhancement filter using a Hessian matrix may be used to extract a sheet-like structure from the input image, and the existence probability may be calculated by setting a high probability around the sheet-like structure.

As a method of calculating the existence probability, a plurality of images may be used in the same inspection. For example, in a CT image of the heart, a plurality of time-phase images may be taken in accordance with the beating of the heart. In this case, the existence probability may be calculated by setting a high probability at a location with a large amount of change in pixel value between a plurality of time phases within the heart. This is based on the fact that valves are moving structures within the heart. However, since not only the valves but also the entire heart may fluctuate significantly between the plurality of time-phase images, the above process needs to be performed after rough fluctuations of the entire heart are corrected. Specifically, the existence probability calculation function 354 first aligns the rough displacement of the entire heart in the plurality of time-phase images. Then, the existence probability calculation function 354 calculates the amount of change in pixels at corresponding locations between the plurality of time phases on the basis of the alignment result.

The existence probability calculation function 354 calculates a change in pixel values over time in each pixel inside the heart, and calculates the existence probability so that a location with a larger change in the calculated pixel value has a high probability. That is, since the heart valve (mitral valve) moves differently from the movement due to pulsation, the existence probability calculation function 354 specifies a portion with a large degree of deformation inside the heart as the heart valve (mitral valve) in the deformation alignment of the heart.

A known nonlinear deformation alignment process can be used for alignment. Examples of the nonlinear deformation alignment process include a free-form deformation (FFD) method and a large deformation diffeomorphic metric mapping (LDDMM) method.

Shape Estimation Process

As described at step S104 in FIG. 2, the shape estimation function 355 calculates the estimated value of the shape of the mitral valve included in the VOI image, on the basis of the VOI image acquired at step S102 and the existence probability of the mitral valve calculated at step S103. Specifically, the shape estimation function 355 calculates, as the estimated value of the shape, coordinate values of a plurality of locations corresponding to the region of interest. More specifically, the shape estimation function 355 calculates the coordinate values of the plurality of locations on the contour of the region of interest. For example, the shape estimation function 355 calculates mesh information of the region of interest. The shape estimation function 355 can use various methods as the process of estimating the shape of the mitral valve. For example, the shape estimation function 355 calculates the estimated value of the shape of the region of interest by the process based on the machine learning. That is, the shape estimation function 355 estimates the shape of the mitral valve by the method based on the machine learning.

When the method based on the machine learning is used as the process of estimating the shape of the mitral valve, the learning function 356 performs a learning process for acquiring a learned model prior to the shape estimation process. Hereinafter, a learned model related to the shape estimation process is described with reference to FIGS. 7A and 7B.

Figure 7A:
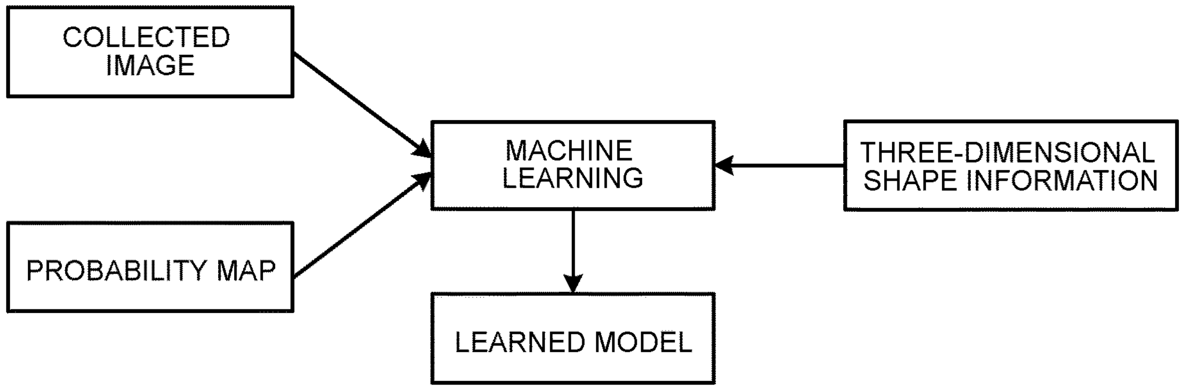
FIG. 7A is a diagram for explaining an example of constructing a learned model related to the shape estimation process according to the first embodiment.

FIG. 7A is a diagram for explaining an example of constructing a learned model related to the shape estimation process according to the first embodiment; For example, as illustrated in FIG. 7A, the learning function 356 generates a learned model by machine-learning a plurality of sets of data (training data) of the collected image depicting the mitral valve, the probability map of the mitral valve in the collected image, and the coordinate values (three-dimensional shape information) indicating the location of the mitral valve in the collected image. For example, the learning function 356 generates the learned model by machine-learning training data with the 64×64×64 pixel image including the mitral valve, the probability map in the image, and the three-dimensional shape information defining the coordinate values of the anterior leaflet and the posterior leaflet of the mitral valve included in the image. Then, the learning function 356 stores the generated learned model in the data server 2 or the storage circuitry 34.

Figure 7B:
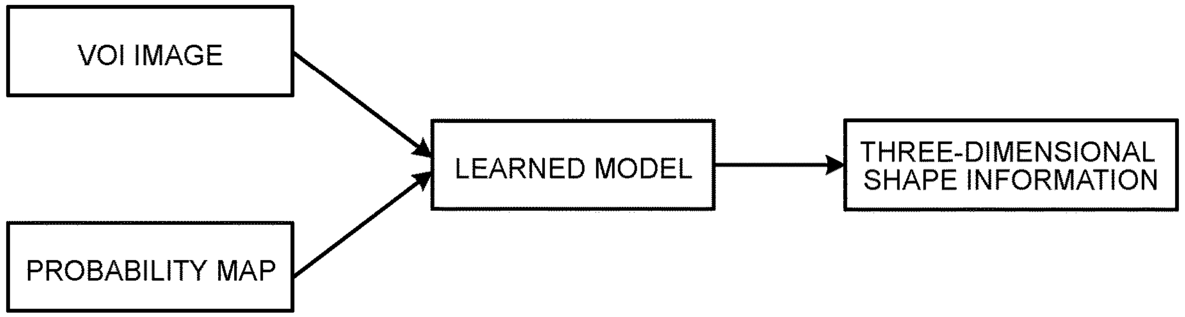
FIG. 7B is a diagram illustrating an example of a learned model related to the shape estimation process according to the first embodiment.

The shape estimation function 355 reads the above learned model stored in the data server 2 or the storage circuitry 34 and inputs the input image and the probability map into the read learned model, thereby calculating the estimated value of the shape of the mitral valve. For example, as illustrated in FIG. 7B, the shape estimation function 355 inputs the VOI image acquired by the region acquisition function 353 and the probability map of the mitral valve in the VOI image calculated by the existence probability calculation function 354 into the learned model, thereby acquiring three-dimensional shape information indicating the shape of the mitral valve included in the VOI image. The shape estimation function 355 can also calculate the estimated value of the shape of the region of interest on the basis of the existence probability for each of a plurality of sites. That is, the shape estimation function 355 can acquire the three-dimensional shape information indicating the shape of the mitral valve on the basis of the VOI image, the existence probability of the anterior leaflet of the mitral valve, and the existence probability of the posterior leaflet of the mitral valve. FIG. 7B is a diagram illustrating an example of a learned model related to the shape estimation process according to the first embodiment.

In the present embodiment, a case where the shape estimation process is performed using a DenseNet, which is a type of CNN, is described as a specific example of the above method based on the machine learning. FIG. 8 is a diagram illustrating an example of a layer structure of the DenseNet according to the first embodiment. For example, the DenseNet includes layers illustrated in FIG. 8, and outputs a plurality of three-dimensional coordinates indicating the shape of the anterior leaflet and three-dimensional coordinates indicating the shape of the posterior leaflet in response to input of the 64×64×64 pixel VOI image and the probability map of three channels of the anterior leaflet, the posterior leaflet, and the background of the mitral valve. For example, the DenseNet in FIG. 8 outputs mesh information including 19×9 coordinates as the plurality of three-dimensional coordinates indicating the shape of the anterior leaflet, and outputs 25×9 coordinates as the three-dimensional coordinates indicating the shape of the posterior leaflet.

Figure 9:
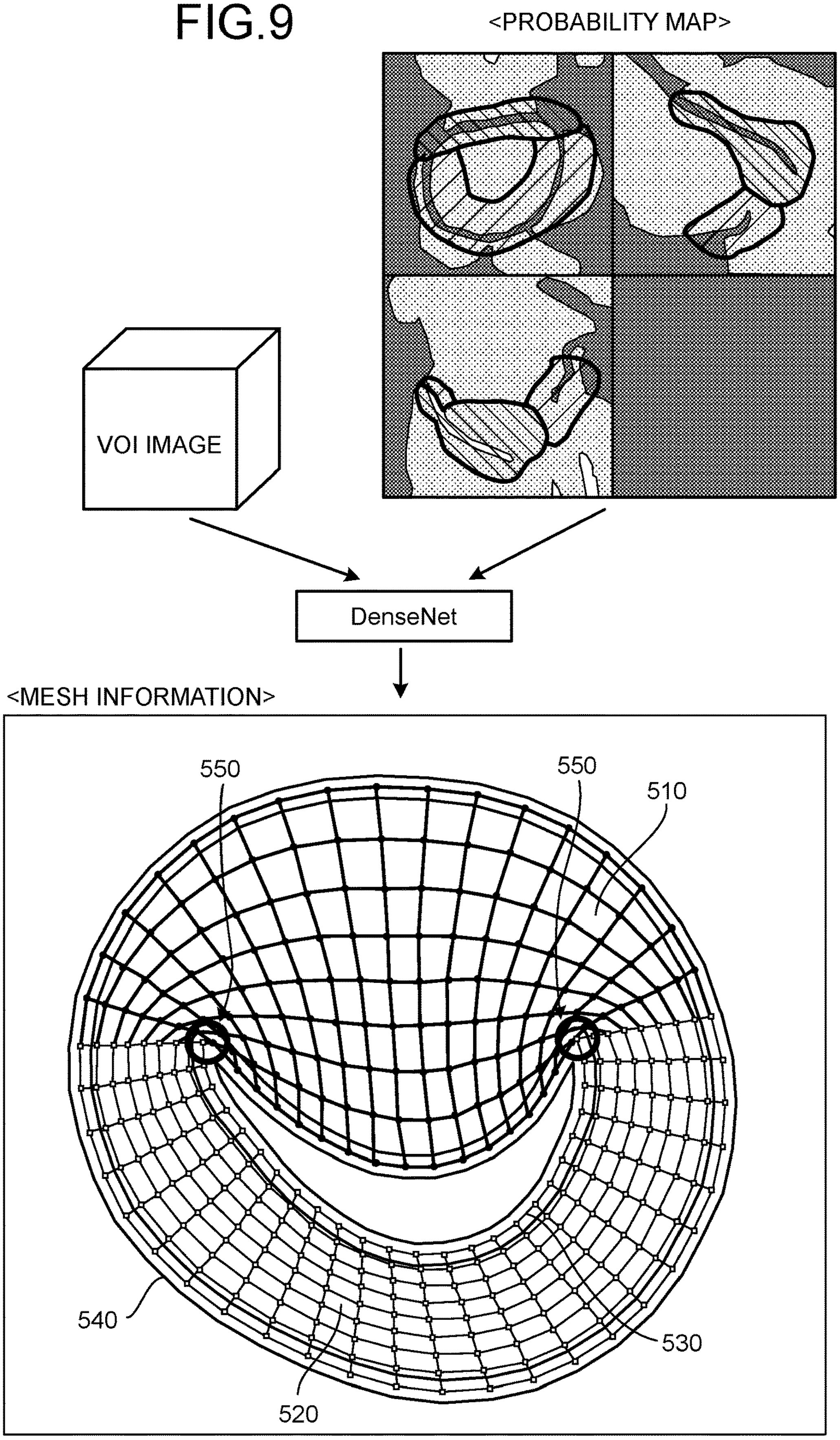
FIG. 9 is a diagram illustrating an example of mesh information according to the first embodiment.

FIG. 9 is a diagram illustrating an example of the mesh information according to the first embodiment. For example, as illustrated in FIG. 9, the shape estimation function 355 acquires the mesh information representing the shape of the mitral valve by inputting the VOI image and the probability map into the DenseNet. As illustrated in FIG. 9, the mesh information is information representing a curved surface bounded by a valve orifice 530 and a valve annulus 540, and is divided into two parts, an anterior leaflet 510 and a posterior leaflet 520, with a commissure of the mitral valve as a boundary. Each of the anterior leaflet 510 and the posterior leaflet 520 includes a plurality of lattice points arranged in a grid pattern. The shape estimation function 355 estimates coordinate values of the three-dimensional locations of each of these lattice points by using the DenseNet.

As described above, the shape estimation function 355 according to the present embodiment calculates the estimated value of the shape of the mitral valve in the VOI image on the basis of the VOI image, and the existence probability of the anterior leaflet and the existence probability of the posterior leaflet in the mitral valve. In this case, the VOI image, the existence probability of the anterior leaflet, and the existence probability of the posterior leaflet, which are inputs, each have the form of image data with the same number of pixels, and in the present embodiment, the above three pieces of information are input to the DenseNet as integrated three-channel image data. Correspondingly, prior training for the DenseNet is also assumed to be performed on the basis of image data and a large number of data on the existence probability.

In the above example, a method of inputting the VOI image and the existence probability of the anterior leaflet and the existence probability of the posterior leaflet in the mitral valve to the CNN as integrated 3-channel image data has been described; however, the implementation is not limited to thereto. For example, a method of inputting the existence probabilities of the anterior leaflet and the posterior leaflet to an intermediate layer instead of the input layer of the CNN is conceivable. Specifically, the existence probabilities of the anterior leaflet and the posterior leaflet can be input to the intermediate layer where a feature map resulting from a convolution operation of the VOI image appears. More specifically, a method of providing the above intermediate layer with an Attention mechanism for calculating the Hadamard product of the feature map and the existence probability is conceivable. According to the above, a high weight is given to a feature map at a location with a high existence probability, resulting in an effect that the estimated value of the shape that more accurately captures “like the mitral valve” in the image can be calculated.

In the above description, a case of calculating the estimated value of the shape of the mitral valve by using the DenseNet, which is a type of CNN, has been described as an example; however, the embodiment is not limited thereto and known CNNs other than the DenseNet may also be used. For example, the estimated value of the shape of the mitral valve may also be calculated by ResNet, VGG16, or the like, which is a type of CNN. The method based on the machine learning other than the CNN may also be used, or the estimated value of the shape of the mitral valve may also be calculated by information processing means other than the machine learning. For example, by constructing a statistical shape model for the shape of the mitral valve in advance and adjusting the parameters of the statistical shape model on the basis of the VOI image and the existence probability, the estimated value of the shape of the mitral valve depicted in the VOI image may also be calculated.

In the above description, a case where the shape estimation function 355 receives, as input, information obtained by integrating the VOI image acquired at step S102 and the existence probability acquired at step S103 has been described as an example; however, the embodiment is not limited thereto. For example, on the basis of the existence probability acquired at step S103, information obtained by cropping the VOI image and the existence probability may also be used as input information in the shape estimation process. The above cropping process may also be performed on the basis of information of the center of gravity position and distribution of the probability in the existence probability acquired at step S103.

Specifically, the region acquisition function 353 acquires a first partial region (VOI image) and a second partial region different from the first partial region. The existence probability calculation function 354 calculates information on the existence probability of the region of interest on the basis of the first partial region. The shape estimation function 355 calculates the estimated value of the shape of the region of interest on the basis of the second partial region and the existence probability. The region acquisition function 353 acquires the second partial region on the basis of the existence probability of the mitral valve calculated by the existence probability calculation function 354.

For example, the region acquisition function 353 further narrows down the region where the mitral valve exists on the basis of the existence probability of the mitral valve calculated at step S103, and acquires the information obtained by cropping the VOI image and the existence probability with respect to the region. Then, the shape estimation function 355 calculates the estimated value of the shape by the above-described CNN or the like on the basis of the acquired information. According to the above, since the estimated value of the shape can be calculated after narrowing down to a region where the mitral valve is highly likely to exist, the effect of obtaining a more accurate result can be expected.

Result Display Process

As described at step S105 in FIG. 2, the control function 351 causes the display 33 to display the estimated value of the shape of the region of interest. Specifically, the control function 351 performs control of generating an image, which shows the estimated value of the shape of the mitral valve calculated at step S104 and is to be displayed on the display 33 and displaying the generated image on the display 33. For example, the control function 351 performs control of generating an image obtained by CG rendering the mesh information, which is the estimated value of the shape of the mitral valve, and causing the display 33 to display the image.

The control function 351 may have the same function as a general medical image viewer, and may perform control of selecting a 2D slice image from the input image in response to user input, generating an image in which the estimated value of the shape of the mitral valve at a location corresponding to the slice image is superimposed on the selected slice image, and displaying the generated image on the display 33. In this case, on the basis of the partial region on the input image from which the VOI image has been cropped at step S102, the estimated value of the shape calculated at step S104 needs to be superimposed after transforming the estimated value into the coordinate system of the input image.

The control function 351 may also perform control of storing the estimated value of the shape of the mitral valve calculated in the process of step S104 in the storage circuitry 34 of the medical image processing apparatus 3 or in the data server 2 via the network 4. In this case, the process of displaying the estimated value of the shape of the mitral valve on the display 33 may not necessarily be performed.

According to the present embodiment, a process of calculating the existence probability of the mitral valve in the input image and calculating the estimated value of the shape of the mitral valve on the basis of the existence probability is performed. By combining a process of calculating an existence probability capturing local image features of the mitral valve, which is a layered structure, with a process of calculating the estimated value of the shape of the mitral valve, which captures the overall structure of the mitral valve, a process of calculating the estimated value of the shape of the mitral valve can be performed with high accuracy and robustness.

First Variation: Variation on VOI Image Cropping Process

In the embodiments described above, a case where at step S102, the region acquisition function 353 performs a process of cropping the VOI image including the mitral valve and calculates the existence probability of the mitral valve for the cropped VOI image has been described as an example. However, the embodiment is not limited thereto.

For example, a plurality of VOI images are acquired by performing an image cropping process on a plurality of regions of the input image acquired at step S101, and the existence probability of the mitral valve is calculated for each VOI image. Then, a existence probability (integrated existence probability) obtained by integrating the calculated results may be acquired, and a region with a high existence probability of the mitral valve may be specified on the basis of the integrated existence probability. In this case, each of the input image and the integrated existence probability can be cropped for a region corresponding to the region with a high existence probability in the integrated existence probability, and step S104 can be performed using the cropping result as input information.

Specifically, the region acquisition function 353 acquires a plurality of partial regions (VOI images) from the input image. The existence probability calculation function 354 calculates the existence probability of the region of interest (mitral valve) in each partial region (VOI image). The region acquisition function 353 specifies a region with a high existence probability of the mitral valve in the entire partial region on the basis of the existence probability in each partial region calculated by the existence probability calculation function 354, and crops a region corresponding to the specified region from the input image and the existence probability (probability map) of the entire partial region. The shape estimation function 355 calculates the estimated value of the shape of the mitral valve on the basis of the cropped image and the existence probability.

By using the above process, for example, the existence probability of the mitral valve can be calculated over the entire input image by a sliding window method to specify a region with a high existence probability. According to the above, the VOI image can be cropped on the basis of the existence probability of the mitral valve, resulting in an effect that the estimated value of the shape of the mitral valve can be calculated with higher accuracy.

Second Variation: Variation on Input Image

In the embodiments described above, an example of using the 3D CT image as the input image has been described; however, the embodiment is not limited thereto. For example, the input image may be a 3D ultrasound image (for example, transcutaneous ultrasound, transesophageal ultrasound, or the like), or may be MRI, PET, SPECT, or the like. A time-series image may also be used as the input image, and for example, the input image may be a time-series 3DCT image (4DCT image). In this case, each of the above processes can be performed on each time-phase image of time-series 3DCT images to calculate the estimated value of the shape of the mitral valve corresponding to each time-phase.

Figure 10:
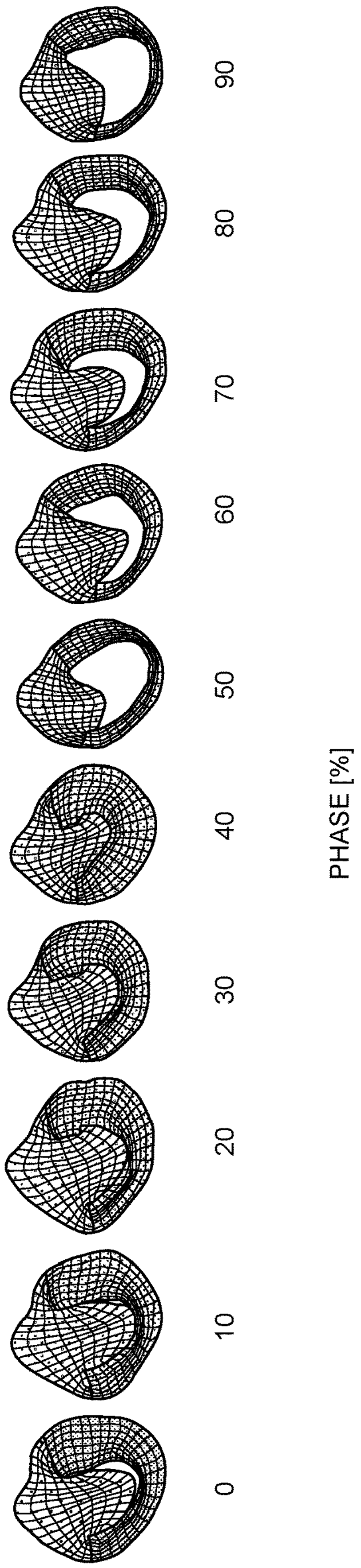
FIG. 10 is a diagram illustrating a display example of an estimated value of a shape of a mitral valve according to a second variation.

When the estimated value of the shape of the mitral valve corresponding to each time phase is calculated, the control function 351 can perform various displays regarding the estimated value of the shape of the mitral valve corresponding to each time phase. FIG. 10 is a diagram illustrating a display example of the estimated value of the shape of the mitral valve according to the second variation. FIG. 10 illustrates a case where the estimated value of the shape of the mitral valve is calculated for a CT image corresponding to 10 time phases in a cardiac cycle.

For example, as illustrated in FIG. 10, the control function 351 can cause the display 33 to display mesh information indicating the shape of the mitral valve at each of 0% of time phase, 10% of time phase, 20% of time phase, 30% of time phase, 40% of time phase, 50% of time phase, 60% of time phase, 70% of time phase, 80% of time phase, and 90% of time phase.

The control function 351 can also display an image of a time phase selected by a user from the time-series 3DCT images, as well as the shape of the mitral valve corresponding to the selected time phase. The control function 351 also displays the calculation results of the shape of the mitral valve corresponding to each time phase of the time-series 3DCT images as a moving image while feeding the time phases, so that a user can ascertain the movement of the mitral valve.

The input image does not necessarily have to be a 3D image, and may be, for example, a 2D image of the mitral valve such as a long-axis image or a short-axis image. For example, the medical image processing apparatus 3 can also calculate the estimated value of the 2D shape of the mitral valve, which is the shape (cross-section shape) of the mitral valve on the two-dimensional image. That is, for the two-dimensional image acquired by the input image acquisition function 352, the region acquisition function 353 performs a process of acquiring an image of a two-dimensional region including the mitral valve. The existence probability calculation function 354 calculates the existence probability of the mitral valve in the acquired image of the two-dimensional region, and the shape estimation function 355 calculates the estimated value of the 2D shape of the mitral valve on the basis of the image of the two-dimensional region and the calculated existence probability.

The medical image processing apparatus 3 can also calculate, for example, the estimated value of a 3D shape estimated from the two-dimensional image. In such a case, for example, the input image acquisition function 352 acquires a plurality of images of the same time phase in which the mitral valve is depicted at different angles. The region acquisition function 353 performs a process of acquiring an image of a two-dimensional region including the mitral valve for each image. The existence probability calculation function 354 calculates the existence probability of the mitral valve in each acquired image. The shape estimation function 355 calculates the estimated value of the 2D shape of the mitral valve for each image on the basis of the existence probability. The shape estimation function 355 further calculates the estimated value of the three-dimensional shape of the mitral valve from values of the 2D shape of the mitral valve estimated from different angles and the standard shape of the mitral valve.

The medical image processing apparatus 3 has both a processing system that takes a two-dimensional image as input and a processing system that takes a three-dimensional image as input, and can switch a processing system to be driven according to the dimension of an actually input image.

Third Variation: Variation on Existence Probability Calculation Process

In the embodiments described above, a case where the existence probability calculation function 354 calculates the existence probabilities of the anterior leaflet, the posterior leaflet, and the background (neither anterior leaflet nor posterior leaflet exist) of the mitral valve has been described; however, the embodiment is not limited thereto. For example, the probability that either the anterior leaflet or the posterior leaflet exists may be calculated without distinguishing the anterior leaflet from the posterior leaflet. In this case, the existence probability is calculated as one-channel information. The information on the existence probabilities of two channels, including the existence probability of the anterior leaflet and the posterior leaflet, may also be calculated. The existence probability of the valve orifice location of the mitral valve, the existence probability of the valve annulus, or the like may also be calculated. That is, information on the existence probability of three channels of the anterior leaflet, the posterior leaflet, and the valve orifice, or information on the existence probability of three channels of the anterior leaflet, the posterior leaflet, and the valve annulus may also be calculated. The existence probability of the location of the commissure, which is the junction of the anterior leaflet and the posterior leaflet in the mitral valve, may also be calculated. That is, the plurality of sites constituting the mitral valve include any of the anterior leaflet, the posterior leaflet, the valve annulus, the valve orifice, and the commissure.

The existence probability calculated at this processing step is not limited to an existence probability for a site constituting the mitral valve, and the existence probability of a site other than the mitral valve may also be calculated. Specifically, the existence probability calculation function 354 calculates information on the existence probability of the region of interest also on the basis of structural information of the region of interest. For example, the existence probabilities of the locations or the like of the left ventricle, the left atrium, and the aortic valve close to the mitral valve may also be calculated. When the existence probability of the site other than the mitral valve is calculated, the existence probability of the site other than the mitral valve may be calculated in addition to the sites constituting the mitral valve, or the existence probability of only the site other than the mitral valve may also be calculated without using the sites constituting the mitral valve.

For example, the existence probability calculation function 354 calculates the existence probability of sites (left atrium and left ventricle) around the mitral valve by the machine learning, and calculates the existence probability of the mitral valve by using the calculated existence probability of the surrounding sites. When the existence probability of only the site other than the mitral valve is calculated without using the sites constituting the mitral valve, the shape estimation function 355 calculates the estimated value of the shape of the site other than the mitral valve, and estimates the shape of the mitral valve on the basis of the calculated estimated value and a standard anatomical structure around the mitral valve.

Even in any of the existence probabilities is calculated, it is assumed that the CNN that calculates the existence probability is appropriately trained in advance so that the existence probability is calculated. The shape estimation function 355 also performs a process of calculating the estimated value of the shape of the mitral valve by using, as input, information obtained by channel integration of the existence probability calculated by the existence probability calculation function 354 and the VOI image. In this case, it is assumed that the CNN used by the shape estimation function 355 to calculate the estimated value of the shape is appropriately trained so that the estimated value of the shape of the mitral valve is calculated on the basis of the above input.

Fourth Variation: Variation on Shape Estimation Process

In the embodiments described above, a case where the shape estimation function 355 calculates the shape of the mitral valve by using the VOI image and the existence probability as input has been described; however, the embodiment is not limited thereto. For example, the shape estimation function 355 may calculate the shape of the mitral valve by using only the existence probability as input without using the VOI image as input. According to the above, the process of step S104 is simplified, thereby making the process more efficient and faster. When the shape of the mitral valve is calculated on the basis of only the existence probability without using the VOI image as input, it is assumed that the CNN used for the process of the shape estimation function 355 is appropriately trained accordingly.

In the embodiments described above, a case where the shape estimation function 355 calculates the estimated values of the shapes of the anterior leaflet and the posterior leaflet in the mitral valve has been described as an example; however, the embodiment is not limited thereto. For example, the shape estimation function 355 may be configured to output the estimated value of an integrated shape of the anterior leaflet and the posterior leaflet in the mitral valve. The form of the estimated value of the shape does not necessarily have to be mesh information arranged in a grid pattern, and may be point group information in an arbitrary arrangement, or the like.

The estimated value of the shape calculated by the shape estimation function 355 is not limited to mesh information indicating the shape of the region of interest (mitral valve), and may also be one calculated on the basis of the mesh information. For example, mesh data (standard model) representing the standard shape of the mitral valve is defined in advance. The shape estimation function 355 can also calculate information on the difference (displacement and deformation) between the calculated estimated value of the shape of the mitral valve and the standard model, and use the calculated information as the estimated value of the shape. The estimated value of the shape does not necessarily have to be in a form including coordinate values of three-dimensional locations, and for example, the shape estimation function 355 can calculate the estimated value of the shape of the mitral valve in the form of information representing the normal direction of a valve, which is a curved surface, a mask image representing the shape of the mitral valve, or the like.

The shape estimation function 355 may also calculate a mask for a region closer to the left atrium or a mask for a region closer to the left ventricle than the mitral valve, instead of the shape of the mitral valve itself. For example, on the basis of the existence probability of a site other than the mitral valve around the mitral valve, the shape estimation function 355 calculates the estimated value of the shape of the site other than the mitral valve. In this way, the shape of the mitral valve (region of interest) may be visualized by estimating the surrounding shape of the mitral valve (region of interest) and displaying information representing the shape.

The estimated value of the shape of the mitral valve calculated by the shape estimation function 355 is not necessarily limited to information representing the shape of the entire mitral valve, and estimated values of the shapes and locations of some sites of the mitral valve, such as the valve orifice, the valve annulus, and the commissure location, may also be calculated.

Fifth Variation: Example Using Different Images for Calculation of Existence Probability and Calculation of Estimated Value of Shape In the embodiments described above, a case where the VOI image acquired on the basis of the input image acquired at step S101 is commonly used at steps S103 and S104 to perform respective processes has been described; however, the embodiment is not limited thereto. For example, an image in which the rough shape of the mitral valve is depicted with low noise may be used as input for the existence probability calculation process at step S103, and differently from the above, step S104 may be performed using, as input, an image in which detailed shape of the mitral valve is depicted with high sensitivity.

More specifically, at step S101, the input image acquisition function 352 acquires two CT images generated by two different types of reconstruction functions. At step S102, the region acquisition function 353 generates two types of VOI images by cropping the two CT images in a common region. Subsequently, at step S103, the existence probability calculation function 354 calculates an existence probability by using one of the two types of VOI images. At step S104, the shape estimation function 355 performs a shape estimation process by using the other VOI image.

The VOI images used at step S103 and step S104 are not limited to a case where the reconstruction functions are different, and for example, the number of pixels, pixel size, cropping position and range relative to an input image, cropping direction, and the like may be different. For example, a method, in which the VOI image used at step S103 uses an image obtained by cropping a wider range of an input image than the VOI image used at step S104, is conceivable. In this case, a CNN for existence probability calculation and a CNN for shape estimation need to be trained appropriately according to the characteristics of each input image. According to the above, the calculation process at each of processing steps S103 and S104 can be performed on the basis of an image with characteristics suitable for each process, so that the calculation process of each processing step can be performed with higher accuracy.

The image to be displayed at step S105 does not necessarily have to be the same as the image used at step S103 or step S104, and a separate image may be acquired for the display process performed at step S105. For example, the image used at step S103 and step S104 may be an image with characteristics that clearly depict the mitral valve, and the image used for display at step S105 may be an image with characteristics that clearly depict the entire heart structure. This has the effect of providing a display that allows a user to ascertain the structure of both the mitral valve and the entire heart at the same time.

Sixth Variation: Correction Process for Estimated Value of Shape

In the embodiments described above, a case where at step S105, the control function 351 displays or stores the estimated value of the shape of the mitral valve calculated by the shape estimation function 355 has been described; however, the embodiment is not limited thereto. For example, the estimated value of the shape of the mitral valve calculated at step S104 may be subjected to an arbitrary shape correction process and displayed or stored. For example, the control function 351 can apply smoothing to the calculated shape of the mitral valve, remove local distortions, or correct shape symmetry. This has the effect of reducing noise related to the shape and allowing a higher quality valve shape to be calculated.

Seventh Variation: Variation on Probability Calculation

In the embodiments described above, a case where the existence probability is calculated from the relationship between pixel values in the input image and morphological features related to the region of interest (mitral valve) has been described; however, the probability calculation method is not limited thereto. For example, the existence probability may be calculated on the basis of information on fluid, such as blood flow, related to the region of interest. In such a case, for example, the direction and velocity of the fluid are acquired using an ultrasound image, and the existence probability is calculated from the characteristics of the fluid relative to the region of interest. For example, the mitral valve controls blood flow between the left atrium and the left ventricle, causing the blood flow to stop and flow at regular intervals. In patients with mitral value regurgitation, the direction of blood flow changes between forward and reverse directions at regular intervals.

Therefore, the existence probability calculation function 354 can calculate the existence probability of the mitral valve in the ultrasound image by using such characteristics. That is, the existence probability calculation function 354 acquires a change in flow rate or flow direction of the blood flow by extracting the amount of change in the pixel value of a specific pixel in a Doppler image. Then, the existence probability calculation function 354 calculates the existence probability on the basis of whether the acquired flow rate or flow direction matches the characteristics of the blood flow described above. Since the ultrasound image can also be used to obtain blood flow velocity, the existence probability may be calculated on the basis of the blood flow velocity.

When the existence probability is to be acquired on an image (for example, CT image) on which blood flow information is difficult to acquire, the existence probability calculation function 354 can calculate the existence probability based on the blood flow information on the image by aligning the image (CT image) and the ultrasound image. In addition to directly calculating the existence probability from a change in the pixel value in the ultrasound image, morphological information may be estimated from a change in the blood flow information on the basis of known fluid structure coupling techniques, and the existence probability may be calculated on the basis of the estimation result. Of course, a learned model representing the relationship between the fluid information and the existence probability of the region of interest may be constructed on the basis of training data prepared in advance using a machine learning technology, and the existence probability may be calculated on the basis of the learned model. The utilization of fluids can be applied to fluid-related organs such as blood flow (urinary organs such as kidneys, ureters, and bladders, organs related to cerebrospinal fluid such as lateral ventricle, third ventricle, cerebral aqueduct, and fourth ventricle, or organs related to digestive juices such as stomach and digestive tract), gas-related organs (organs related to breathing such as lungs, trachea, vocal cords, and diaphragm), and organs through which an individual flows (esophagus, intestine, or the like).

In another example, the existence probability may also be calculated on the basis of electrical information related to the region of interest. Specifically, the existence probability calculation function 354 acquires electrical information in the heart by using a cult system or an electrocardiogram, and calculates the existence probability from the characteristics of the electrical information with respect to the region of interest in the heart. The utilization of the electrical information can be applied to the brain in addition to the heart. In such a case, the existence probability calculation function 354 can acquire electrical information in brain activity by using ECG or MEG, and calculate the existence probability of a target brain region from the electrical information of the brain activity.

In further another example, the existence probability may be calculated on the basis of hardness information related to the region of interest. Specifically, the existence probability calculation function 354 acquires hardness information in the liver by using ultrasound elastography, and calculates the existence probability from the characteristics of the hardness information for a target structure in the liver.

In still another example, the existence probability may be calculated on the basis of functional information or physiological information related to the region of interest. Specifically, the existence probability calculation function 354 acquires an image representing specific functional information and physiological information at each location in the body by using radiopharmaceuticals and SPECT equipment, and calculates the existence probability from the functional information and the physiological information.

Eighth Variation: Variation on Estimated Value Calculation

In the embodiments described above, a case where at step S104, the existence probability is input to layers at the same location in the layer structure of the learned model related to the shape estimation process has been described. However, the embodiment is not limited thereto, and for example, a plurality of existence probabilities may be input to layers at different locations in a learning model including a plurality of layer structures. For example, the shape estimation function 355 may perform control so that the existence probability of the anterior leaflet is input to the input layer and the existence probability of the posterior leaflet is input to the intermediate layer.

Ninth Variation: Variation on Probability Used for Estimated Value Calculation

In the embodiments described above or the eighth variation, a case where one type of existence probability (based on shape) is input to the learned model for the shape estimation process has been described. However, the embodiment is not limited thereto, and a plurality of existence probabilities calculated in a plurality of types may be input to the learned model related to the shape estimation process as described in the seventh variation. In this case, the plurality of existence probabilities may be input to layers (input layer, intermediate layer, and the like) at the same location or layers at different locations. By inputting existence probabilities calculated by different types of methods, more information and more accurate shape estimation can be expected.

As described above, according to the first embodiment, the input image acquisition function 352 acquires an input image including the region of interest of a subject. The existence probability calculation function 354 calculates information on the existence probability of the region of interest on the basis of the input image. The shape estimation function 355 calculates the estimated value of the shape of the region of interest on the basis of the input image and the information on the existence probability. Consequently, the medical image processing apparatus 3 according to the first embodiment enables highly accurate estimation of the shape of the region of interest by combining a process of capturing the local features of the region of interest and a process of capturing the overall shape of the region of interest.

According to the first embodiment, the region of interest includes a plurality of sites. The existence probability calculation function 354 calculates the existence probability for each of the plurality of sites. The shape estimation function 355 calculates the estimated value of the shape of the region of interest on the basis of the existence probability for each of the plurality of sites. Consequently, the medical image processing apparatus 3 according to the first embodiment can capture the local features of the region of interest more finely, thereby enabling highly accurate estimation of the shape of the region of interest.

According to the first embodiment, the region of interest is a mitral valve, and the plurality of sites includes any of an anterior leaflet, a posterior leaflet, a valve annulus, a valve orifice, and a commissure. Consequently, the medical image processing apparatus 3 according to the first embodiment enables highly accurate estimation of the shape of the mitral valve.

According to the first embodiment, the input image acquisition function 352 acquires a three-dimensional CT image as an input image. Consequently, the medical image processing apparatus 3 according to the first embodiment enables highly accurate estimation of the three-dimensional shape of the region of interest.

According to the first embodiment, the shape estimation function 355 calculates, as the estimated value of the shape, the coordinate values (mesh information) of a plurality of locations corresponding to the region of interest. The shape estimation function 355 also calculates, as the estimated value of the shape, information indicating the normal direction of a curved surface in the region of interest. Consequently, the medical image processing apparatus 3 according to the first embodiment makes it possible to estimate a more accurate shape of the region of interest in the input image.

According to the first embodiment, the region acquisition function 353 acquires a partial region including the region of interest from the input image. The existence probability calculation function 354 calculates the information on the existence probability of the region of interest on the basis of the partial region acquired by the region acquisition function 353. The shape estimation function 355 calculates the estimated value of the shape of the region of interest on the basis of the partial region acquired by the region acquisition function 353 and the existence probability. Consequently, the medical image processing apparatus 3 according to the first embodiment enables the existence probability calculation process and the shape estimation process to be executed accurately and efficiently.

According to the first embodiment, the region acquisition function 353 acquires a first partial region and a second partial region different from the first partial region. The existence probability calculation function 354 calculates the information on the existence probability of the region of interest on the basis of the first partial region. The shape estimation function 355 calculates the estimated value of the shape of the region of interest on the basis of the second partial region and the existence probability. Consequently, the medical image processing apparatus 3 according to the first embodiment can use different regions from a region where the existence probability is calculated and a region used for the shape estimation process, thereby enabling an appropriate region to be used in each process.

According to the first embodiment, the region acquisition function 353 acquires the second partial region on the basis of the information on the existence probability of the region of interest calculated by the existence probability calculation function 354. Consequently, the medical image processing apparatus 3 according to the first embodiment can calculate the estimated value of a shape of a target region corresponding to the existence probability, thereby enabling more accurate estimation of the shape of the region of interest.

According to the first embodiment, the existence probability calculation function 354 calculates the information on the existence probability of the region of interest by a process based on machine learning. The shape estimation function 355 calculates the estimated value of the shape of the region of interest by the process based on the machine learning. The machine learning is a convolutional neural network. Consequently, the medical image processing apparatus 3 according to the first embodiment makes it possible to implement a process corresponding to the region of interest.

Other Embodiments

In the embodiments described above, a case where the region of interest is a mitral valve has been described. However, the embodiment is not limited thereto, and the region of interest may be a heart valve other than the mitral valve (aortic valve, tricuspid valve, or the like), or a site other than the heart valve.

In the embodiments described above, a case where the medical image processing apparatus 3 constructs a learned model by performing the learning function 356 has been described. However, the embodiment is not limited thereto, and a medical image processing apparatus different from the medical image processing apparatus 3 may also construct the learned model by performing the learning function 356. That is, an apparatus that constructs the learned model and an apparatus that performs each process of estimating the shape of the region of interest may be different apparatuses.

In the embodiments described above, an example in which the acquisition unit, the region acquisition unit, the first calculation unit, the second calculation unit, and the learning unit in this specification are respectively implemented by the input image acquisition function, the region acquisition function, the existence probability calculation function, the shape estimation function, and the learning function of the processing circuitry have been described; however, the embodiment is not limited thereto. For example, the acquisition unit, the region acquisition unit, the first calculation unit, the second calculation unit, and the learning unit in this specification may implement the same functions only by hardware, only by software, or a combination of hardware and software, in addition to the input image acquisition function, the region acquisition function, the existence probability calculation function, the shape estimation function, and the learning function described in the embodiments.

The term "processor" used in the description of the embodiments described above means, for example, circuitry such as a central processing unit (CPU), a graphics processing unit (GPU), an application specific integrated circuit (ASIC), or a programmable logic device (for example, a simple programmable logic device (SPLD), a complex programmable logic device (CPLD), and a field programmable gate array (FPGA)). Instead of storing the computer programs in a storage circuitry, the computer programs may be directly incorporated in the circuitry of the processor. In this case, the processor implements the functions by reading and executing the computer programs incorporated in the circuitry. Furthermore, each processor of the present embodiment is not limited to being configured as single piece of circuitry for each processor, and one processor may be configured by combining a plurality of pieces of independent circuitry to implement the functions thereof.

The medical image processing program executed by the processor is provided by being incorporated in advance in a read only memory (ROM), the storage circuitry, or the like. The medical image processing program may be provided by being recorded on a computer readable non-transitory storage medium, such as a CD (compact disc)-ROM, a flexible disk (FD), a CD-R (compact disc recordable), and a digital versatile disc (DVD), in a file format installable or executable in these devices. Furthermore, the medical image processing program may be provided or distributed by being stored on a computer connected to a network such as the Internet and downloaded via the network. For example, the medical image processing program is configured as a module including the above-described each processing function. As actual hardware, the CPU reads and executes the medical image processing program from the storage medium such as a ROM, so that each module is loaded on a main storage device and produced on the main storage device.

In the embodiments and the variations described above, each component of each device illustrated in the drawings is a functional concept, and does not necessarily have to be physically configured as illustrated in the drawings. That is, the specific form of dispersion or integration of each device is not limited to those illustrated in the drawings, but can be configured by functionally or physically dispersing or integrating all or part thereof in arbitrary units, depending on various loads and usage conditions. Moreover, each processing function performed by each device can be implemented in whole or in part by a CPU and a computer program that is analyzed and executed by the CPU, or by hardware using wired logic.

Of the processes described in the embodiments and the variations described above, all or part of the processes described as being performed automatically can be performed manually, or all or part of the processes described as being performed manually can be performed automatically by known methods. Processing procedures, control procedures, specific names, and information including various data and parameters described in the above description and drawings may be changed as desired, unless otherwise noted.

According to at least one of the embodiments described above, the shape of the region of interest can be estimated with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to
- acquire an input image including a region of interest of a subject,
- acquire a partial region including the region of interest from the input image,
- acquire information on an existence probability of the region of interest based on the acquired partial region, and
- calculate an estimated value of a shape of the region of interest based on the acquired partial region and the information on the existence probability by using a learned model that uses, as input, the acquired partial region and the information on the existence probability, and outputs the estimated value of the shape of the region of interest.

2. The medical image processing apparatus according to claim 1, wherein
the region of interest includes a plurality of sites, and
the processing circuitry is further configured to
- acquire information on the existence probability related to each of the plurality of sites, and
- calculate the estimated value of the shape of the region of interest based on the information on the existence probability related to each of the plurality of sites.

3. The medical image processing apparatus according to claim 2, wherein the region of interest is a mitral valve.

4. The medical image processing apparatus according to claim 3, wherein the plurality of sites include any of an anterior leaflet, a posterior leaflet, a valve orifice, a valve annulus, and a commissure.

5. The medical image processing apparatus according to claim 1, wherein the processing circuitry is further configured to acquire a three-dimensional CT image as the input image.

6. The medical image processing apparatus according to claim 1, wherein the processing circuitry is further configured to calculate, as the estimated value of the shape, coordinate values of a plurality of locations corresponding to the region of interest.

7. The medical image processing apparatus according to claim 6, wherein the processing circuitry is further configured to calculate mesh information of the region of interest.

8. The medical image processing apparatus according to claim 1, wherein the processing circuitry is further configured to calculate, as the estimated value of the shape, information indicating a normal direction of a curved surface in the region of interest.

9. The medical image processing apparatus according to claim 1, wherein the processing circuitry is further configured to:

acquire a first partial region and a second partial region different from the first partial region, acquire the information on the existence probability of the region of interest based on the first partial region, and calculate the estimated value of the shape of the region of interest based on the second partial region and the existence probability.

10. The medical image processing apparatus according to claim 9, wherein the processing circuitry is further configured to acquire the second partial region based on the acquired information on the existence probability of the region of interest.

11. The medical image processing apparatus according to claim 1, wherein the processing circuitry is further configured to acquire the information on the existence probability of the region of interest further based on structural information in a vicinity of the region of interest.

12. The medical image processing apparatus according to claim 1, wherein the processing circuitry is further configured to acquire the information on the existence probability of the region of interest by a process based on machine learning.

13. The medical image processing apparatus according to claim 12, wherein the machine learning is a convolutional neural network.

14. A medical image processing method, comprising:

acquiring an input image including a region of interest of a subject;

acquiring a partial region including the region of interest from the input image;

acquiring information on an existence probability of the region of interest based on the acquired partial region; and calculating an estimated value of a shape of the region of interest based on the acquired partial region and the information on the existence probability by using a learned model that uses, as input, the acquired partial region and the information on the existence probability, and outputs the estimated value of the shape of the region of interest.

15. A non-transitory computer readable medium comprising instructions that cause a computer to execute:

acquiring an input image including a region of interest of a subject;

acquiring a partial region including the region of interest from the input image;

acquiring information on an existence probability of the region of interest based on the acquired partial region; and calculating an estimated value of a shape of the region of interest based on the acquired partial region and the information on the existence probability by using a learned model that uses, as input, the acquired partial region and the information on the existence probability, and outputs the estimated value of the shape of the region of interest.

16. A medical image processing apparatus, comprising:

processing circuitry configured to acquire an input image including a region of interest of a subject, acquire information on an existence probability of the region of interest based on the input image, and calculate coordinate values of a plurality of locations of a mesh structure of the region of interest as an estimated value of a shape of the region of interest based on the input image and the information on the existence probability by using a learned model that uses, as input, the input image and the information on the existence probability, and outputs coordinate values at a plurality of locations of a mesh structure of the region of interest.

17. A medical image processing method, comprising:

acquiring an input image including a region of interest of a subject;

acquiring information on an existence probability of the region of interest based on the input image; and calculating coordinate values of a plurality of locations of a mesh structure of the region of interest as an estimated value of a shape of the region of interest based on the input image and the information on the existence probability by using a learned model that uses, as input, the input image and the information on the existence probability, and outputs coordinate values at a plurality of locations of a mesh structure of the region of interest.

18. A non-transitory computer readable medium comprising instructions that cause a computer to execute:

acquiring an input image including a region of interest of a subject;

acquiring information on an existence probability of the region of interest based on the input image; and calculating coordinate values of a plurality of locations of a mesh structure of the region of interest as an estimated value of a shape of the region of interest based on the input image and the information on the existence probability by using a learned model that uses, as input, the input image and the information on the existence probability, and outputs coordinate values at a plurality of locations of a mesh structure of the region of interest.

* * * * *